June 23, 1936. J. R. MARTIN Re. 20,017

BLOW-OUT PREVENTER AND SUPPORT

Original Filed Aug. 29, 1927 2 Sheets-Sheet 1

John R. Martin INVENTOR.

BY Jesse R. Stone

ATTORNEYS.

June 23, 1936. J. R. MARTIN Re. 20,017

BLOW-OUT PREVENTER AND SUPPORT

Original Filed Aug. 29, 1927 2 Sheets-Sheet 2

John R. Martin

INVENTOR.

BY Jesse R. Stone

ATTORNEYS.

Reissued June 23, 1936

Re. 20,017

UNITED STATES PATENT OFFICE 20,017

BLOWOUT PREVENTER AND SUPPORT

John R. Martin, Houston, Tex., assignor to James S. Abercrombie, Houston, Tex.

Original No. 1,967,417, dated July 24, 1934, Serial No. 216,308, August 29, 1927. Application for reissue September 23, 1935, Serial No. 41,784

15 Claims. (Cl. 251—62)

My invention relates to a device for attachment at the upper end of a well casing in deep well operations and serving the purpose of closing the space about the drill stem and between the same and the casing, said attachment serving in case of an emergency to prevent a blowout of the well.

It is also an object of the invention to provide means to support the drill stem in deep well operations, said means including pipe engaging slips, and to provide effective means for conveniently raising and lowering the slips from their seat, when desired, so as to engage or release the drill stem.

It is a further object of the invention to provide mechanically operated means for simultaneously opening or closing the valves about the drill stem so that said valves may be operated quickly when emergency arises.

It often occurs in drilling oil wells that a pocket of gas is tapped or that a pool of oil under great pressure is encountered, the drill bit and drill stem in these instance is often forced upwardly thru the casing along with the fluid. This is generally termed a "blowout" and it is to prevent this that the valve is here provided. In event the pressure suddenly slackens the drill stem may drop back into the well and to prevent this the slips here shown are to check any downward movement.

Figures 1, 3:
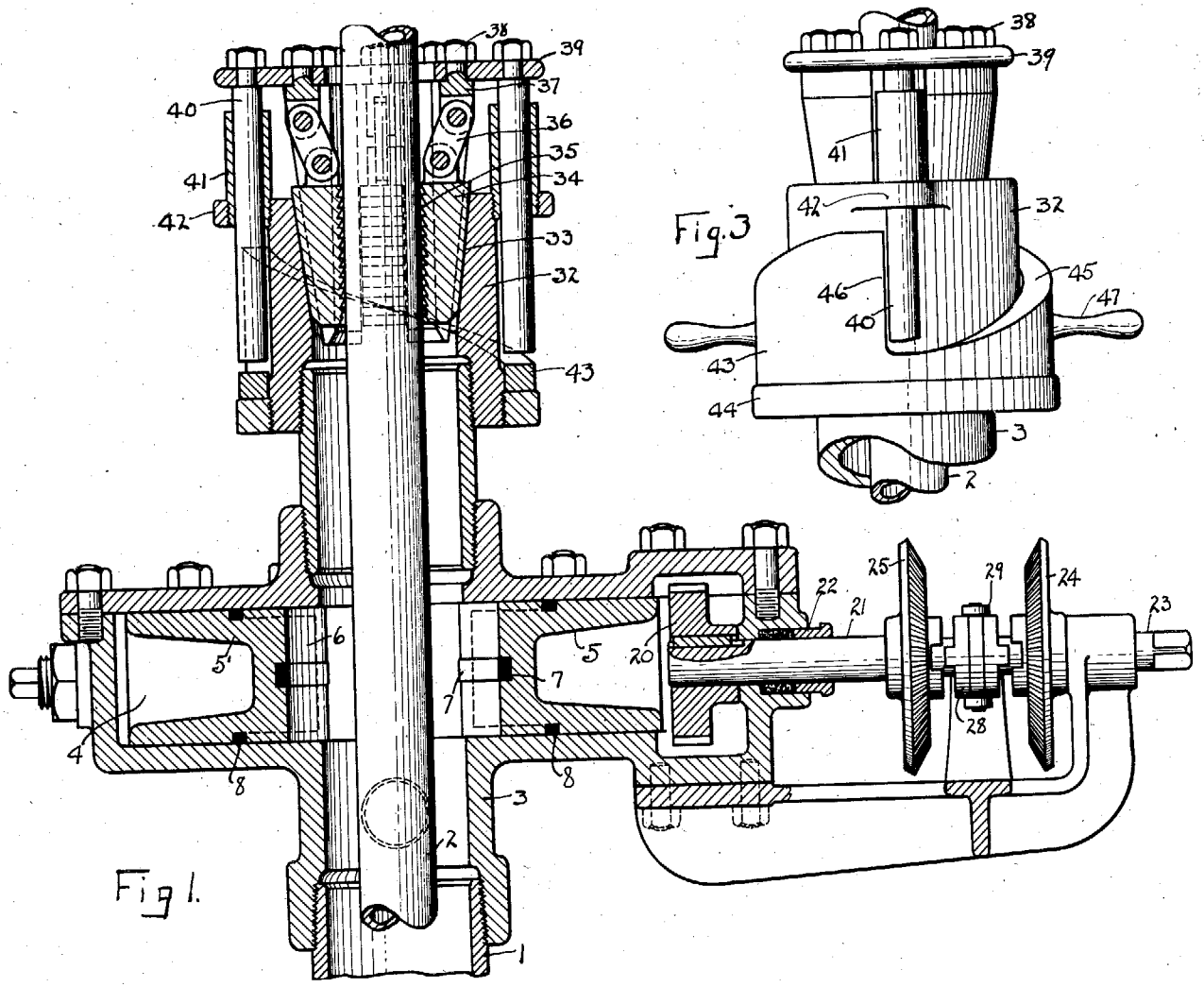
Figure 2:
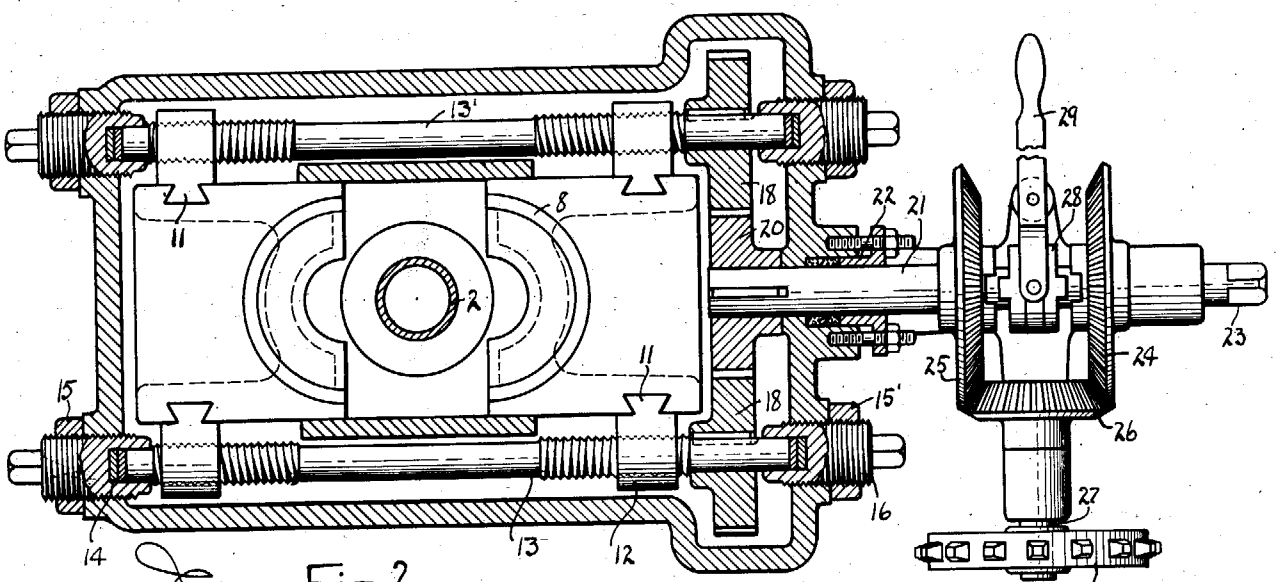
Figure 4:
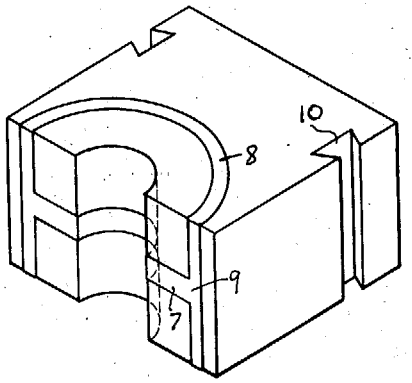

Referring to the drawings herewith, Fig. 1 is a side view in central vertical section through a blowout preventer and supporting means embodying my invention. Fig. 2 is a plan view in section through the blowout preventer constituting a part of my invention. Fig. 3 is a side elevation of the drill stem supporting means; and Fig. 4 is a perspective view of one of the valve members employed with the blowout preventer.

In carrying out my invention, I provide a blowout preventer adjacent the upper end of the casing. The said casing is illustrated at 1 and a drill stem 2 is shown as being operated downwardly within the casing during the drilling operation. The blowout preventer comprises a housing 3 having a vertical passage therethrough for the drill stem and lateral extensions on each side of the drill stem passage. The general form of this structure is shown particularly in Fig. 2 in the drawings, and it will be noted that the housing is approximately rectangular in shape.

The housing encloses a chamber 4 in which two opposite valves 5 and 5' are slidable. The said valves are formed with semi-cylindrical recesses 6 on their forward faces of the proper size to fit about the drill stem 2. The forward face of the valve has a transverse groove in which is placed a strip of packing 7 of some compressible composition, such as rubber, adapted to fit against the drill stem. The transverse strip 7 of packing is connected at its ends with a vertical strip 9 which extends from the upper to the lower side of the valve face and is then curved at 8 around the upper and lower faces of the valve member, as shown best in Fig. 4, and it will be noted that these strips of packing may be formed in one continuous piece. The upper and lower curved portions 8 project from the upper and lower faces of the valve to bear against the upper and lower walls of the housing so as to preserve a fluid tight fit with the said housing and with the drill stem.

Each of the valve members 5' and 5 have transversely extending morticed grooves 10 therein to engage with tongues 11 upon nuts 12. The said nuts 12 are threaded upon a shaft 13 and there are two opposite shafts 13 and 13' in the housing, said shafts being journaled at one end in plugs 14 threaded on their outer surfaces to screw within the end walls of the housing and adapted to be locked in adjusted position by lock nuts 15. The opposite ends of the shafts 13 and 13' are journaled within similar threaded plugs 16, also screwed within the end walls of the housing and locked in position therein.

On each of the shafts 13 and 13' are gears 18, said gears being keyed to the shaft so as to rotate therewith. The two gears 18 are spaced apart a sufficient distance to include between them an operating gear 20, which is fixed upon an operating shaft 21 journaled in the end wall of the housing and having a fluid-tight fit therewith through means of a stuffing box 22.

The operating shaft 21 has its outer end 23 squared to receive a crank or other similar means of operation, but it is contemplated that the shaft may be rotated mechanically through means of gears 24 and 25 on the shaft and spaced apart to mesh with a gear 26 upon a stub shaft 27. Between the two gears 24 and 25 is a clutch ring 28. Said ring is keyed to the shaft, the two gears 24 and 25 being idle thereon. The clutch ring is operated to engage with either of the gears 24 and 25 to communicate rotation to the shaft in either direction, depending upon which gear is engaged. A handle 29 on the clutch allows the control of the clutch ring.

The gear 26 on the shaft 27 may be operated through any source of power. A sprocket wheel 30 on said shaft indicates a connection with any preferred form of mechanical power.

In the operation of the blowout preventer, it will be obvious that the clutch 28 may be moved to engage with either of the gears 24 or 25 to rotate the shaft 21 and the connected shafts 13 and 13′ in the direction desired to move the valves to or from their operative position in engagement with the drill stem. It is to be understood that the threaded portions of the shafts 13 and 13′ upon which the nuts 12 are engaged is of opposite direction at the opposite ends of the shafts. That is, the thread at one end of each shaft is a right-hand thread and the threads at the opposite ends of the shafts are left-hand threads. This makes it possible to move the valves toward or away from each other through the rotation of the two shafts, as described.

Obviously the valves may be moved simultaneously into closed position when emergency arises and this movement may be expedited through the mechanical means of control described and shown.

When the drill stem is supported in position while the valves are being closed, I employ as a supporting device a pipe engaging member connected with the casing above the blowout preventer. This device includes a bushing 32 of tubular construction, the lower end being connected with the casing and the upper portion provided with a downwardly tapered seat 33 to receive pipe engaging slips 34. Said slips are of the usual construction, the forward face being toothed at 35 to engage with the drill stem. The upper ends of the jaws constituting the slips are connected by links 36 to the lower heads 37 of bolts 38 extending through a plate 39.

The plate 39 is an annular plate having an opening centrally to allow the passage of the drill stem. It is of sufficient width to extend outwardly from the slips to receive pins 40. Said pins 40 are fixed to said plate and extend downwardly therefrom through guide sleeves 41, detachably mounted within bosses 42 at the upper end of the bushing 32. The lower ends of the pins 40 are adapted to ride upon a sleeve 43 fitted about the bushing 32 and resting rotatably upon a ring 44 screwed upon the lower end of the bushing and projecting radially therefrom. The sleeve 43 has a double cam track 45 thereon, that is, the upper face of the said sleeve is provided with a vertical shoulder 46 on opposite sides, the upper end below the shoulder being extended spirally upward for an extent of 180 degrees about the bushing. The sleeve 43 may be rotated by means of handles 47 so that when the sleeve is rotated in a left-hand direction, as seen in Fig. 3, the cam surface 45 will engage beneath the pins 40 and force them upwardly, raising the plate 39 and the slips. Manifestly, when the sleeve 43 is rotated in the opposite direction, a plate with the slips thereon will be allowed to drop.

The particular construction of the slips employed is not a part of the present invention, but attention is called to the fact that between adjacent slips and jaws 34 I have rigid guide members. These guide mmebers are secured also to the plate 39 and separate the adjacent slips from each other and serve to guide them into the seat 33 in the bushing so that their operation will be made accurate and exact. When the pipe engaging device is operated, it will be obvious that a single operator may rotate the controlling sleeve 33 to raise or lower the slips from their seat in the bushing with little difficulty and he will be assured that the jaws of the slips will be moved simultaneously and through an equal distance and that they will always be assured of fitting accurately in engagement with the pipe and seat when it is desired to grip the pipe. The advantages of this construction will be obvious to those skilled in the art.

What I claim as new is:

1. In a blowout preventer including a housing and rams therein, means to move said rams simultaneously, a skeleton packing carried by each ram, said skeleton including a transverse sealing portion, vertical sealing portions connected to the ends of said transverse portion, and a semi-circular portion connected to the ends of said vertical portions and adapted to seal against said housing.

2. In a blowout preventer, a housing, a passage through said housing, said passage being in axial alignment with a well bore; rams in said housing, said rams being diametrically opposed and slidably adapted to close said passage about an object therein; packing in said rams, said packing being skeletonlike and extending horizontally across a portion of the front faces of said rams and having an arcuate portion spaced from said front portion and extending arcuately around said passage, said horizontal and arcuate portions being connected.

3. In a casing shut-off control, a rubber packing body including a diametrical portion with an obverse face to set against an opposed part and from which portion integrally extend lateral, parallel half-ring laps in spaced relation and adapted to be snapped into corresponding ring grooves in a complementary ram element, the said laps extending unidirectionally from the reverse face of said portion.

4. In a casing shut-off control, a rubber packing body including a diametrical portion with an obverse face to set against an opposed part and from the reverse face of which extend parallel, half-ring laps in spaced relation and adapted to be snapped into corresponding ring grooves in a complementary ram element; the said portion having an arc part to set against a corresponding object and radial webs connecting the extremities of the arc to the said laps.

5. In a casing shut-off control, a rubber packing element including a diametrical body portion to set against an opposed part and from one face of which extend, unidirectional, symmetrical lateral loops to snap into respective grooves provided therefor in a gate member against which said portion is adapted to bear when said member is interposed between the loops.

6. In a casing shut-off control, a gate member having a transverse, packer supporting face and flat, top and bottom members which have packer loop grooves commencing and ending in said face and forming intermediate bearing lands, and a packing rubber including a main facing body lapped against said face and having top and bottom loops extending laterally from the obverse face of said body and countersunk in said grooves and surrounding said lands.

7. In a blowout preventer including a housing, and rams thereon, means to move said rams simultaneously, a packing carried by each ram, said packing including a transverse sealing portion, vertical sealing portions connected to the ends of said transverse portion, and a semi-circular portion connected to the ends of said vertical portions and adapted to seal against said housing.

8. In a blowout preventer, a housing, a passage through said housing, said passage being in axial alignment with a well bore; rams in said housing, said rams being diametrically opposed and slidably adapted to enter said passage; packing in said rams, said packing extending horizontally across the front faces of said rams and also comprising a portion spaced radially from said horizontal portion and extending arcuately around said passage to seal against said housing, said horizontal and arcuate portions being connected.

9. A blowout preventer including a housing, a vertical passage therethru, lateral recesses extending from the passage, flat top and bottom faces in said recesses, a flat ram slidable in each recess to move in said passage, a packing on the front of each ram, and an arcuate packing carried by each ram to seal against one of said flat faces around said passage, said arcuate packing being connected to said front packing at its ends and spaced therefrom intermediate its ends.

10. A blowout preventer including a housing, flat rams slidable transversely of said housing, flat faces in said housing adjacent the flat faces or said rams, a passage thru said housing, an annular packing seated in the ram and arranged to seal with the flat face of the housing, and a packing spaced from the body of the first packing but connected to the ends of said first packing and disposed to seal the front of each ram.

11. A well head closure comprising a housing to be positioned on the well and having a passage therethru to be closed, members slidable in said housing transversely of said passage to close the same, packing carried by each member, said packing being positioned on the front of said members and arcuately around said passage and also to form a seal with said housing, and a portion of each of said members spacing said arcuate packing from the front of the member.

12. In a blowout preventer having metal rams to enter the passage, the combination of a packing across the front face of each ram to provide a horizontal seal, a circumferential packing extending around the passage when the rams are closed and having its ends connected to said front face packing, and a metal portion of the ram spacing said circumferential packing from the front face packing.

13. The combination with a blowout preventer ram having a flat top face, an arcuate groove in said ram, a packing in said groove to seal across said top face, a packing across the front of said ram joined at its ends to said groove packing whereby a seal is formed across the top and front of said ram.

14. A blowout preventer housing having flat chambers therein, flat metal ram members movable in said chambers, a passage through the housing, said rams being movable into said passage, a packing on the front of each ram to abut the other ram in sealing engagement, an arcuate groove in the top of each ram, which grooves form a circle about said passage when the rams are closed, a semi-circular packing in each groove to seal against the top of the chamber and joined to the front packing.

15. A blowout preventer housing having flat chambers therein, flat metal ram members movable in said chambers, a passage through the housing, said rams being movable into said passage, a packing on the front of each ram to abut the other ram in sealing engagement, an arcuate groove in the top of each ram, which grooves form a circle about said passage when the rams are closed, a semi-circular packing in each groove to seal against the top of the chamber and joined to the front packing, and a semi-circular recess in the front of the ram and the front packing to fit about a pipe passing through the preventer

JOHN R. MARTIN.